(12) United States Patent
Lustig

(10) Patent No.: US 11,866,275 B2
(45) Date of Patent: Jan. 9, 2024

(54) UNLOADING BULK GOODS FROM A LATERALLY OPEN LARGE CONTAINER

(71) Applicant: SIEMENS LOGISTICS GMBH, Nuremberg (DE)

(72) Inventor: Ralph Lustig, Oberasbach (DE)

(73) Assignee: Siemens Logistics GmbH, Nuremberg (DE)

( * ) Notice: Subject to any disclaimer, the term of this patent is extended or adjusted under 35 U.S.C. 154(b) by 287 days.

(21) Appl. No.: 17/415,304

(22) PCT Filed: Dec. 10, 2019

(86) PCT No.: PCT/EP2019/084327
§ 371 (c)(1),
(2) Date: Jun. 17, 2021

(87) PCT Pub. No.: WO2020/126641
PCT Pub. Date: Jun. 25, 2020

(65) Prior Publication Data
US 2022/0055845 A1    Feb. 24, 2022

(30) Foreign Application Priority Data
Dec. 21, 2018 (EP) .................................. 18215495

(51) Int. Cl.
*B65G 65/23* (2006.01)
*B66F 9/02* (2006.01)
*B65G 13/00* (2006.01)

(52) U.S. Cl.
CPC ............... *B65G 65/23* (2013.01); *B66F 9/02* (2013.01); *B65G 13/00* (2013.01)

(58) Field of Classification Search
CPC .................................. B65G 65/23; B66F 9/02
See application file for complete search history.

(56) References Cited

U.S. PATENT DOCUMENTS 2,321,300 A * 6/1943 Keagy .................... B65G 65/23
                                                    248/133
3,347,399 A * 10/1967 Ensinger ................ B65G 65/23
                                                    108/6
(Continued)

FOREIGN PATENT DOCUMENTS

CN    102745511 A    10/2012
CN    106144643 A    11/2016
(Continued)

OTHER PUBLICATIONS

Kanehira et al. (JP 2002-128281 A). English language machine translation. Retrieved May 24, 2023 from Espacenet. (Year: 2002).*

*Primary Examiner* — Jonathan Snelting
(74) *Attorney, Agent, or Firm* — Laurence A. Greenberg; Werner H. Stemer; Ralph E. Locher

(57) ABSTRACT

A method unloads bulk goods from a laterally open large container using an unloading device with a tilting unit and a platform. The tilting unit and the platform have a common rotational axis. Both the bulk goods and the unloading device are prevented from being damaged. The laterally open large container which is filled with a bulk good is positioned on the tilting unit. The platform is flipped up such that the platform closes the opening side of the large container. The tilting unit is tilted together with the large container located thereon and the platform closing the opening side of the large container about the common rotational axis such that the large container is positioned on the container opening side, and the bulk good is deposited on the platform. The tilting unit is then tilted back together with the large container, the bulk good remaining on the platform.

18 Claims, 8 Drawing Sheets

(56) References Cited

U.S. PATENT DOCUMENTS

| | | | | |
|---|---|---|---|---|
| 3,978,999 | A | * 9/1976 | Ryder | B65G 65/23 |
| | | | | 414/404 |
| 4,802,810 | A | * 2/1989 | Gunn | B65G 59/08 |
| | | | | D34/28 |
| 8,172,498 | B2 | 5/2012 | Enekel | |
| 11,104,527 | B1 | * 8/2021 | Zhao | B65G 47/905 |

FOREIGN PATENT DOCUMENTS

| | | | |
|---|---|---|---|
| DE | 102007018634 | B3 | 8/2008 |
| EP | 1829804 | A2 | 9/2007 |
| FR | 3010989 | A1 | 3/2015 |
| JP | 2002128281 | A | 5/2002 |
| WO | 2009126109 | A1 | 10/2009 |

* cited by examiner

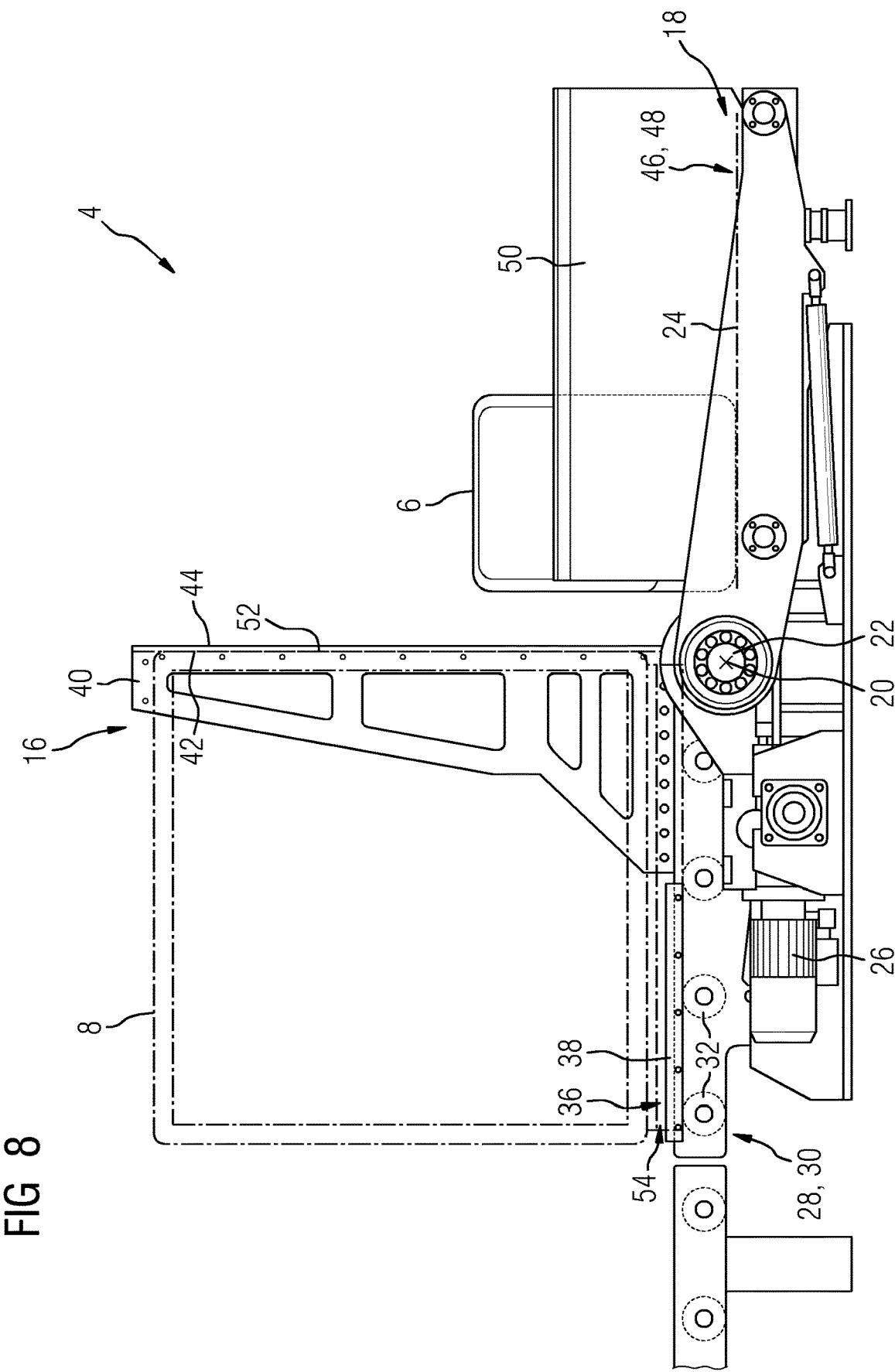

UNLOADING BULK GOODS FROM A LATERALLY OPEN LARGE CONTAINER

BACKGROUND OF THE INVENTION

Field of the Invention

In the field of logistics large containers, which are filled with packages or other bulk goods, are unloaded by hand as a rule, before the bulk goods are sorted in a sorting system for example.

In airports too the manual unloading of large containers, which are filled with items of baggage for example, is widespread. However, especially in this area, the use of unloading aids and/or of (semi)-automatic unloading devices is very much on the increase.

For example unloading devices are known which tilt the filled and laterally open large container by approx. 45°, so that the bulk goods fall out from the opening side of the large container. To empty it completely the large container can be agitated. The unloading device can have a conveyor belt for example on which the bulk goods that have fallen out land and which transports the bulk goods away.

A problem here is that the bulk goods can be damaged by the impact. Moreover heavy bulk goods can cause damage to the unloading device itself by their impact. Furthermore a few components of the unloading device are subjected to major wear by the agitation.

SUMMARY OF THE INVENTION

An object of the invention is to specify an improved method for unloading bulk goods from a laterally open large container, in which both the bulk goods and also the unloading device itself are protected.

The object is achieved by a method for unloading bulk goods from a laterally open large container using an unloading device with at least one tilting unit and a platform, wherein the tilting unit and the platform have a common rotational axis.

In the method, in accordance with the invention, a laterally open large container, which is filled with at least one bulk good, is positioned on the tilting unit and the platform will be and/or is flipped upwards in such a way that the platform closes the opening side of the large container. Further the tilting unit together with the large container located thereon and the platform closing the opening side of the large container is tilted about the common rotational axis in such a way that the large container is positioned on its opening side, wherein at least one bulk good is deposited on the platform. Then the tilting unit together with the large container is tilted back, wherein the at least one bulk good remains on the platform.

The method can be run automatically, in particular the method can run with only minimal operator intervention, for example to open the large container and/or for rectifying faults.

In this way the method can be cost-effective.

Because of the tilting of the tilting unit together with the large container located thereon and the platform closing the opening side of the large container the bulk goods can be handled in a protective manner. In particular the process in which bulk goods fall out of the large container can be dispensed with. Preferably, in the joint tilting of the tilting unit together with the large container located thereon and the platform closing the opening side of the large container, the bulk goods are deposited on the platform.

Agitation of the large container in order to empty it can also be dispensed with. In this way the unloading device itself can also be protected.

A container that can accommodate a number of bulk goods of the same type can be referred to as a large container. Preferably the large container can accommodate a number of items of baggage.

The large container can, for example, be a transport container. Preferably the large container is a container used in air transport, in particular a Unit Load Device (ULD) used in air transport. The large container can further be a container for a cargo ship, for a truck and/or for a freight train.

The side of the laterally open large container that is open can be referred to as the opening side of the large container.

The bulk good can be an item of baggage for example. The bulk good can further be a package. Other bulk goods can further also be possible.

When the large container is positioned on the tilting unit the tilting unit is preferably in an initial position.

The large container can be positioned on the tilting unit using a conveyor means. The conveyor means can for example feature at least a conveyor belt, conveyor rollers, conveyor balls and/or the like. The conveyor means can further be an active or a passive conveyor means.

Preferably the conveyor means is an element of the unloading device.

The conveyor means can be an element of the tilting unit. In this case the tilting unit is preferably tilted together with the conveyor means during the tilting process.

The conveyor means can further be separate to the tilting unit. In this case the conveyor means preferably remains in its position when the tilting unit is tilted during the tilting process.

Expediently the tilting process comprises the tilting of the tilting unit, in particular together with the platform. When there is a large container on the tilting unit, the tilting process then preferably comprises the tilting of the tilting unit together with the large container located thereon and the platform closing the opening side of the large container. In particular the tilting process can comprise a transition of the tilting unit from its initial position into a tilted position of the tilting unit.

It is further advantageous for the tilting process to comprise the tilting back of the tilting unit, in particular together with the large container. In particular the tilting process can comprise a transition of the tilting unit from its tilted position back into its initial position.

Expediently the large container is positioned on the tilting unit in such a way that the opening side of the large container rests against a frame-shaped stop of the tilting unit.

It is preferred that the frame-shaped stop has an opening. Advantageously the frame-shaped stop does not close the opening side.

Preferably the tilting unit is tilted together with the frame-shaped stop during the tilting process. In particular the opening side of the large container can remain resting against the frame-shaped stop of the tilting unit during the tilting process.

When the platform is flipped upwards in such a way that the platform closes the opening side of the large container the platform is preferably brought into a vertical position or it is preferably located in a vertical position. Preferably the tilting unit remains in its initial position when the platform is flipped upwards.

If the tilting unit has the frame-shaped stop previously mentioned the platform preferably rests against the frame-shaped stop of the tilting unit in its flipped up state. In particular the large container and the flipped up platform can rest against opposite sides of the frame-shaped stop.

In particular the platform can remain resting against the frame-shaped stop of the tilting unit during the tilting. The large container and the tilted-up platform can further remain resting against opposite sides of the frame-shaped stop during the tilting.

It is advantageous for the positioned large container to be latched onto the tilting unit using a latching apparatus, in particular for the tilting process. Expediently the large container remains latched onto the tilting unit during the tilting process.

Expediently the latching apparatus is a part of the unloading device. In particular it is preferred that the latching apparatus be a part of the tilting apparatus.

Expediently the latched large container remains in a constant position with regard to the tilting unit. In this way a slippage and/or tilting-away of the large container during the tilting process can be avoided.

Because of the latching the large container is preferably tilted about the same rotational axis as the tilting unit and the platform. This means that the common rotational axis of the tilting unit and the platform can at the same time be the rotational axis of the large container.

Advantageously the tilting unit, the large container and the platform are tilted by at least 65°, in particular by at least 75°, especially preferably by at least 80°, about the common rotational axis. It is further advantageous for the tilting unit, the large container and the platform to be tilted by a maximum of 115°, in particular by a maximum of 105°, especially preferably by a maximum of 100° about the common rotational axis. For example the tilting unit, the large container and the platform can be tilted by 90° about the common rotational axis.

When the large container is positioned on its opening side, the large container is then preferably laid on its opening side. In other words: When the large container is positioned on its opening side, the large container preferably lies on its opening side.

When the tilting unit together with the large container located thereon and the platform closing the opening side of the large container is tilted about the common rotational axis, the platform then preferably remains in the position that closes the opening side of the large container.

When the tilting unit together with the large container located thereon and the platform closing the opening side of the large container is tilted about the common rotational axis, the platform then preferably flips downwards.

Expediently the at least one bulk good, in particular during the tilting process, is placed on the platform that is flipping downwards. For example the bulk good can slip and/or tilt against the platform and/or in the direction of the platform during the tilting process. In this way protective handling of the bulk good can be made possible. The unloading device itself can also be protected in this way.

When the tilting unit together with the large container located thereon and the platform is fully tilted, in particular when the platform is in the flipped down state, the bulk goods preferably lie on the platform.

As described previously, the tilting unit is then tilted back together with the large container, wherein the at least one bulk good remains on the platform. This means that the large container is preferably tilted back in the emptied state.

Preferably the at least one bulk good remaining/lying on the platform is then transported away from the platform by means of a conveyor means.

Expediently the conveyor means for transporting the at least one bulk good away is an element of the unloading device.

Preferably the conveyor means for transporting the bulk good away is an element of the platform. In principle the conveyor means for transporting the bulk good away can also be a separate element from the platform.

At least if a plurality of bulk goods has been unloaded, the bulk goods are expediently fed from the platform to a separation unit. By means of the separation unit a one-dimensional flow of bulk goods is preferably created.

The invention is further directed to an unloading device for unloading bulk goods from a large container.

The inventive unloading device comprises a tilting unit and a platform. The tilting unit and the platform have a common rotational axis, about which the tilting unit and the platform are able to be moved.

The platform can be positioned in a flipped down position and in a flipped up position.

In the flipped up position the platform, when a laterally open large container is positioned on the tilting unit, further closes an opening side of the large container. The large container can be filled with at least one bulk good.

The tilting unit is configured, on transition of the platform from the flipped up position to the flipped down position, to tilt together with the platform about the rotational axis in such a way that the position of the platform does not change relative to the tilting unit.

In this way, when the laterally open large container is positioned on the tilting unit, the tilting unit, together with the large container located thereon and the platform closing the opening side of the large container, is able to be tilted about the common rotational axis in such a way that the large container is positioned on its opening side. If the large container was filled with at least one bulk good, the bulk good can be deposited on the platform in this way.

The tilting unit is further configured to tilt back into the initial position after tilting, wherein the platform remains in the flipped down position.

In this way, when at least one bulk good has been placed on the platform, the at least one bulk good can then remain on the platform when the titling unit tilts back.

The inventive unloading device can be the unloading device mentioned above in conjunction with the method.

Consequently the elements of the unloading device mentioned below can be the elements mentioned above in conjunction with the method.

Preferably the unloading device comprises a conveyor means which is configured to position the large container on the tilting unit.

In a preferred embodiment of the invention the tilting unit has a frame-shaped stop. Preferably, when a laterally open large container is positioned on the tilting unit, the opening side of the large container is then resting against a first side of the frame-shaped stop. It is further preferred that, in its flipped up state, the platform rests against a second side of the frame-shaped stop. In particular the second side can be an opposite side to the first side.

It is advantageous for the unloading device to comprise a latching apparatus for latching a large container positioned on the tilting unit. In particular the tilting unit can feature the latching apparatus.

The platform can further have a conveyor means for transporting away bulk goods.

The invention is further directed to an unloading system with the aforementioned unloading device and a separation unit downstream of the unloading device for creating a one-dimensional flow of bulk goods.

The unloading system can be employed for carrying out the method previously described.

The separation unit can have a lifting gate. The lifting gate can be configured to create a two-dimensional flow of bulk goods from a three-dimensional pile of bulk goods.

The separation unit can further have a leveler. The leveler can be configured to create a one-dimensional flow of bulk goods from a two-dimensional flow of bulk goods.

It is advantageous for the leveler to directly adjoin the lifting gate.

In this way a space saving unloading and separation of the bulk goods can be achieved.

In principle other separation units are also possible, for example with waterfall levels or similar.

The invention is further directed to a use of the aforementioned method, the aforementioned unloading device and/or the aforementioned unloading system for unloading items of baggage and/or packages from a large container. In particular the large container can be a transport container.

The description given previously of advantageous embodiments of the invention contains numerous features, which are in some cases reproduced in the individual dependent claims as several combined. These features can however expediently also be considered individually and combined to form sensible further combinations. In particular these claims are each able to be combined individually and in any given suitable combination with the inventive method, the inventive unloading device and the inventive use.

Thus the method features are also to be seen as subjectively formulated as a characteristic of the corresponding device unit and vice versa.

Even if, in the description or in the claims, a few terms are used in the singular in each case or in conjunction with a numeral, the scope of the invention should not be restricted for these terms to the singular or to the respective numeral.

The characteristics, features and advantages of this invention described above, as well as the manner in which these are achieved, will become clearer and easier to understand in conjunction with the description given below of the exemplary embodiments, which will be explained in greater detail in conjunction with the drawings. The exemplary embodiments serve to explain the invention and do not restrict the invention to the combination of features specified therein, also not with regard to functional features. Moreover suitable features of each exemplary embodiment can also be considered explicitly in isolation, removed from an exemplary embodiment, inserted into another exemplary embodiment as an addition and be combined with any of the claims.

BRIEF DESCRIPTION OF THE SEVERAL VIEWS OF THE DRAWING

FIG. 8 shows the unloading device from FIG. 3 and the large container, wherein the tilting unit together with the large container is tilted back and the platform has remained in the flipped down position.

DETAILED DESCRIPTION OF THE INVENTION

Figure 1:
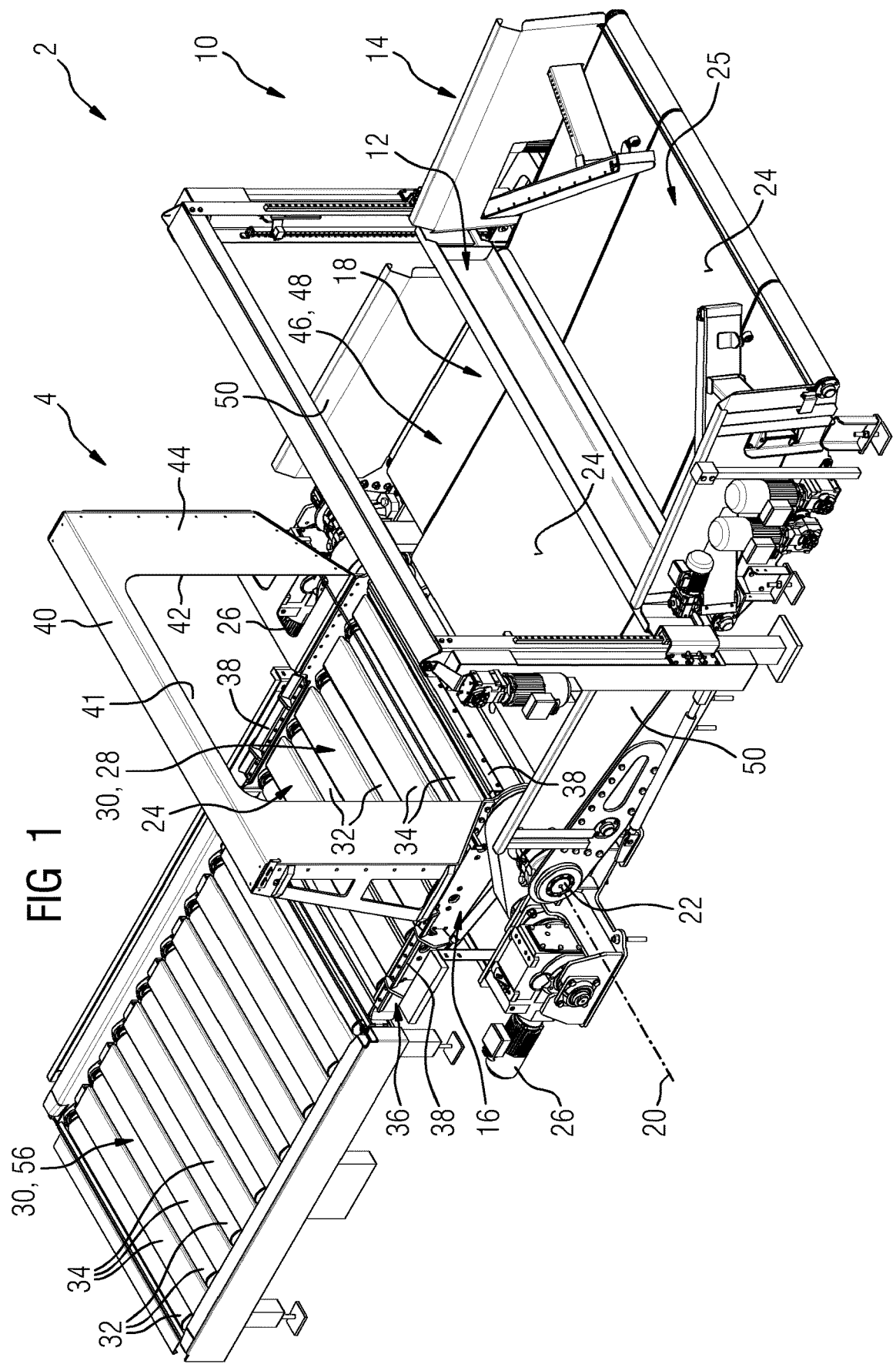
FIG. 1 shows a schematic of an unloading system with an unloading device and a separation unit in a three-dimensional view.
Figure 2:
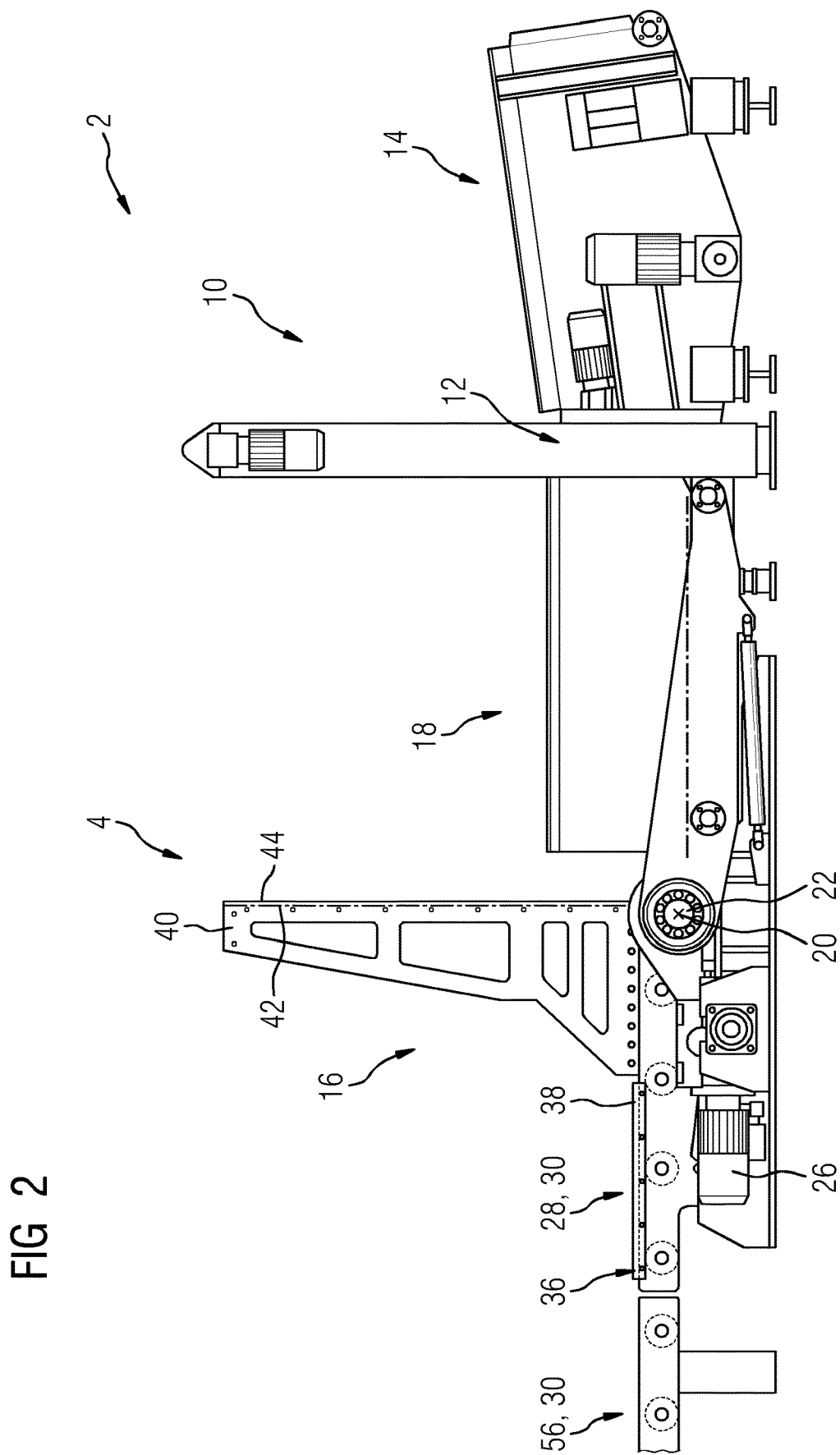
FIG. 2 shows the unloading system from FIG. 1 in a view from the side.

FIG. 1 shows a schematic of an unloading system 2 in a three-dimensional view. FIG. 2 further shows the unloading system 2 from FIG. 1 in a view from the side.

The unloading system 2 shown in FIG. 1 and FIG. 2 comprises an unloading device 4. The unloading device 4 is suitable for unloading bulk goods 6 from a laterally open large container 8 (cf. FIG. 3 to FIG. 8). The unloading system 2 further comprises a separation unit 10 downstream from the unloading device 4 with a lifting gate 12 and a leveler 14.

The unloading device 4 comprises a tilting unit 16 and a platform 18. The tilting unit 16 and the platform 18 have a common rotational axis 20, about which the tilting unit 16 and the platform 18 are able to be moved. The unloading device 4 has a mechanical shaft 22 for this purpose, on which on the one hand the tilting unit 16 and on the other hand the platform 18 are supported.

The platform 18 is able to be positioned in a flipped down position and in a flipped up position. In FIG. 1 and FIG. 2 the platform 18 is shown in its flipped down position.

In the flipped down position of the platform 18 (also: in the flipped down state of the platform 18) the support surface 24 of the platform 18 and the support surface 24 of the leveler 14 form an at least essentially continuous support surface 25.

Figure 4:
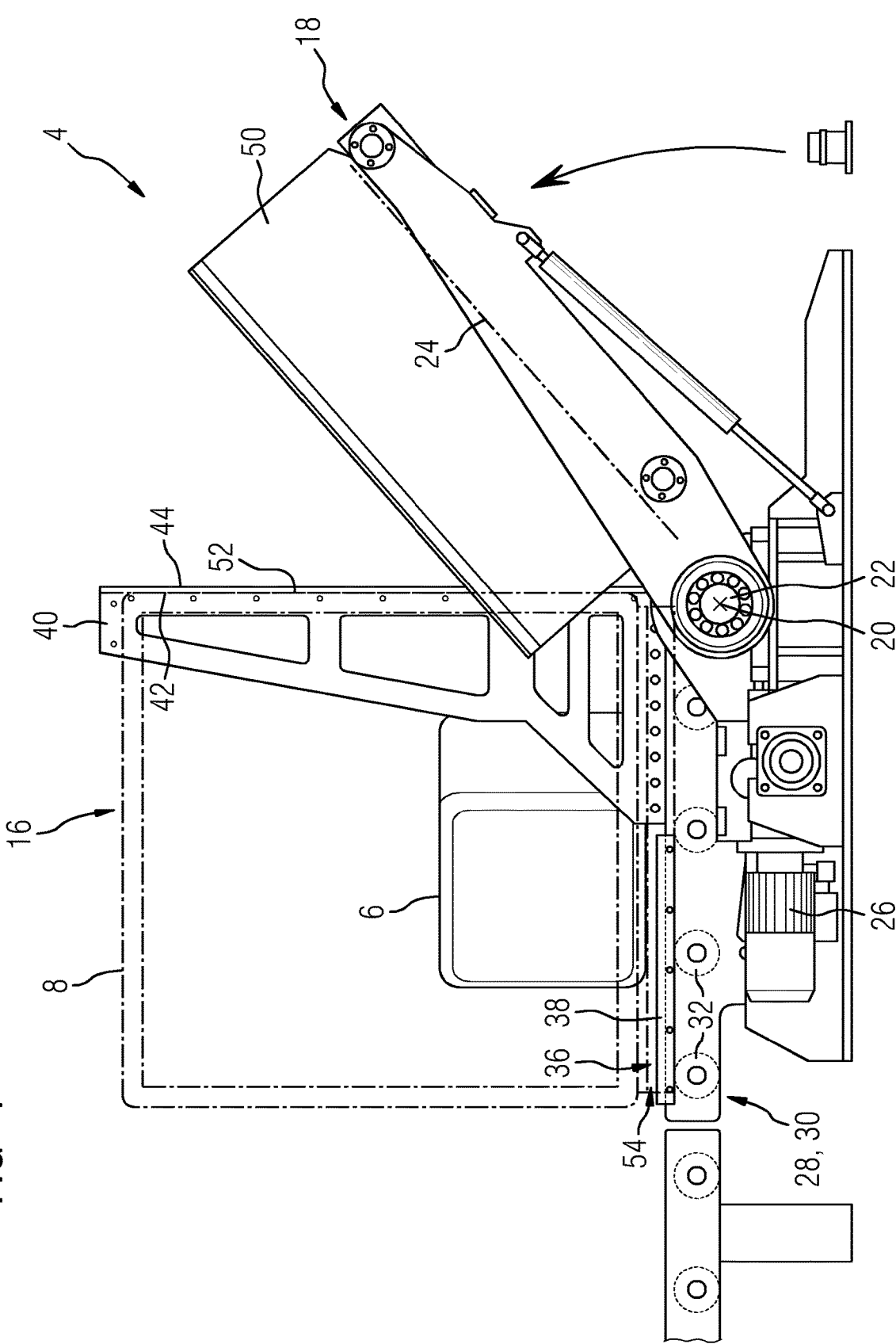
FIG. 4 shows the unloading device from FIG. 3 and the positioned large container, which is laterally open, when the platform is being flipped upwards.
Figure 6:
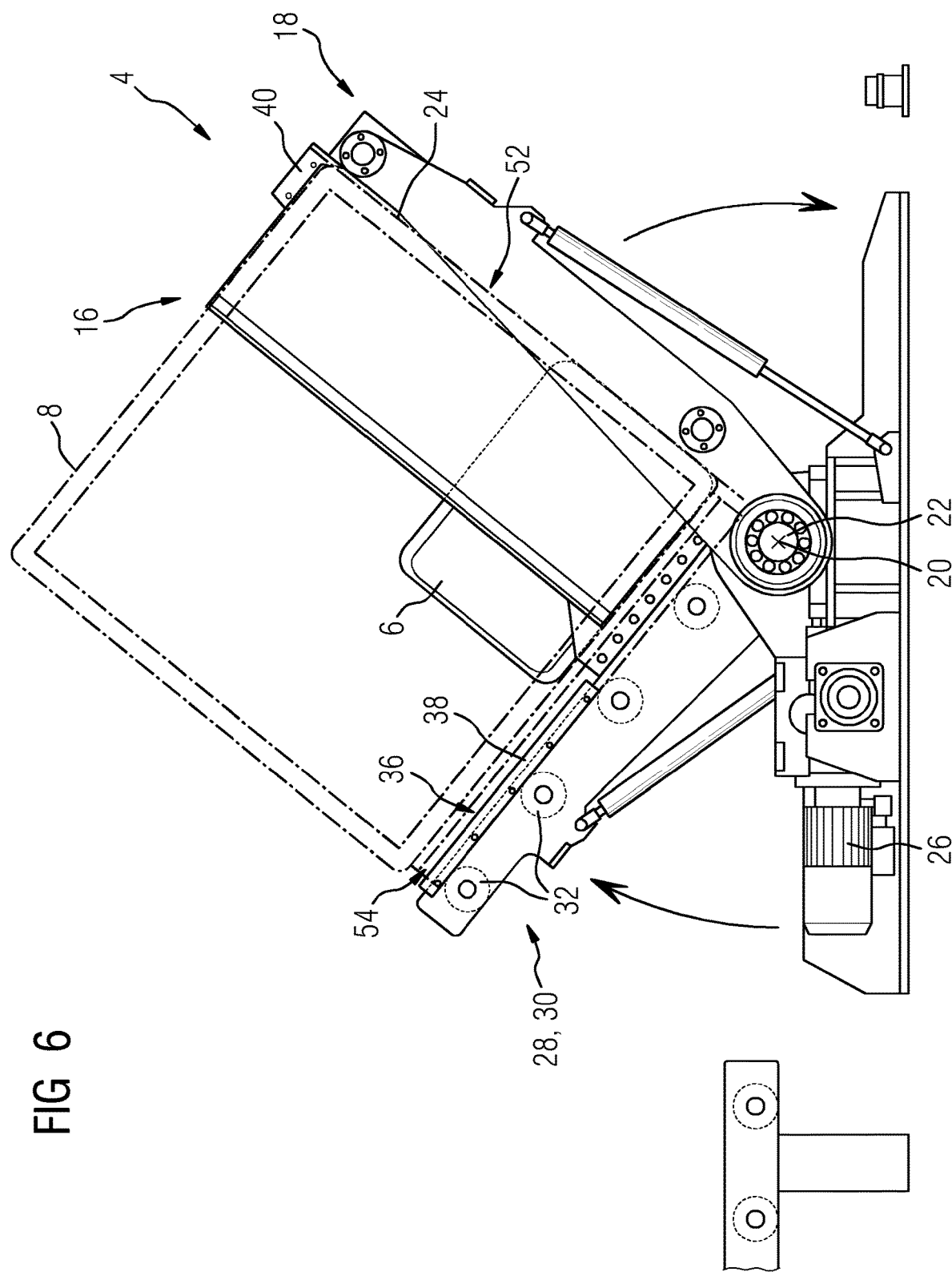
FIG. 6 shows the unloading device from FIG. 3 and the large container, wherein the tilting unit is being tilted together with the large container and the platform.

When the platform 18 is flipped up or flipped down a movement of the platform about the aforementioned rotational axis 20 takes place (cf. FIG. 4 and FIG. 6). The platform 18 can be flipped up or flipped down using at least one drive element 26 of the unloading device 4, here using two motors 26 of the unloading device 4.

Figure 5:
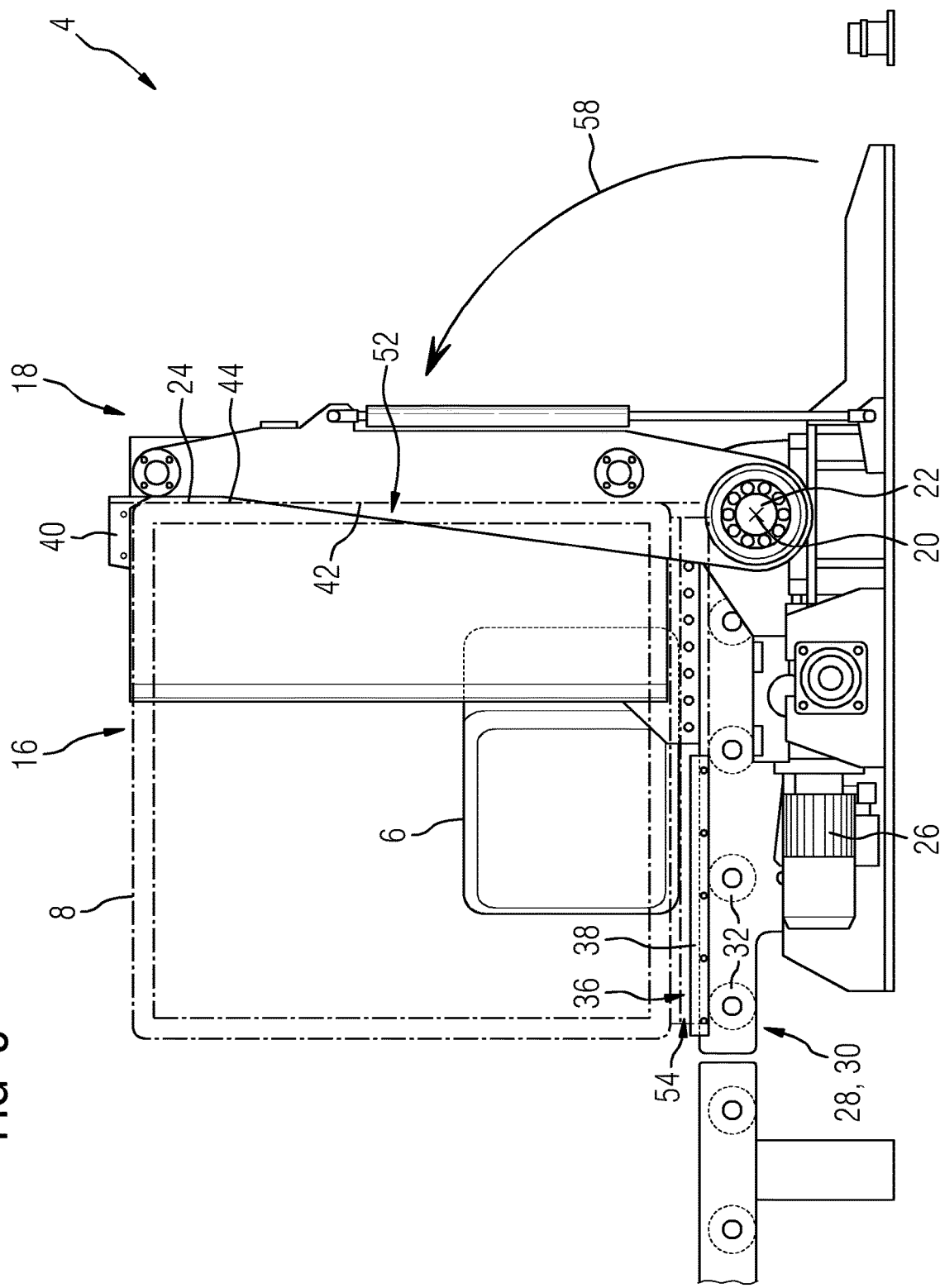
FIG. 5 shows the unloading device from FIG. 3 and the large container, wherein the platform is flipped upwards.

Then, when a laterally open large container 8 is positioned on the tilting unit 16, the platform 18, in the flipped up position, closes an opening side 52 of the large container (cf. FIG. 5).

The tilting unit 16 is shown in FIG. 1 and FIG. 2 in its initial position. The tilting unit 16 can be tilted, wherein there is a movement of the tilting unit 16 about the aforementioned rotational axis 20. The tilting unit 16 can be tilted or tilted back using at least one drive element 26 of the unloading device 4, here using the aforementioned two motors 26.

Figure 7:
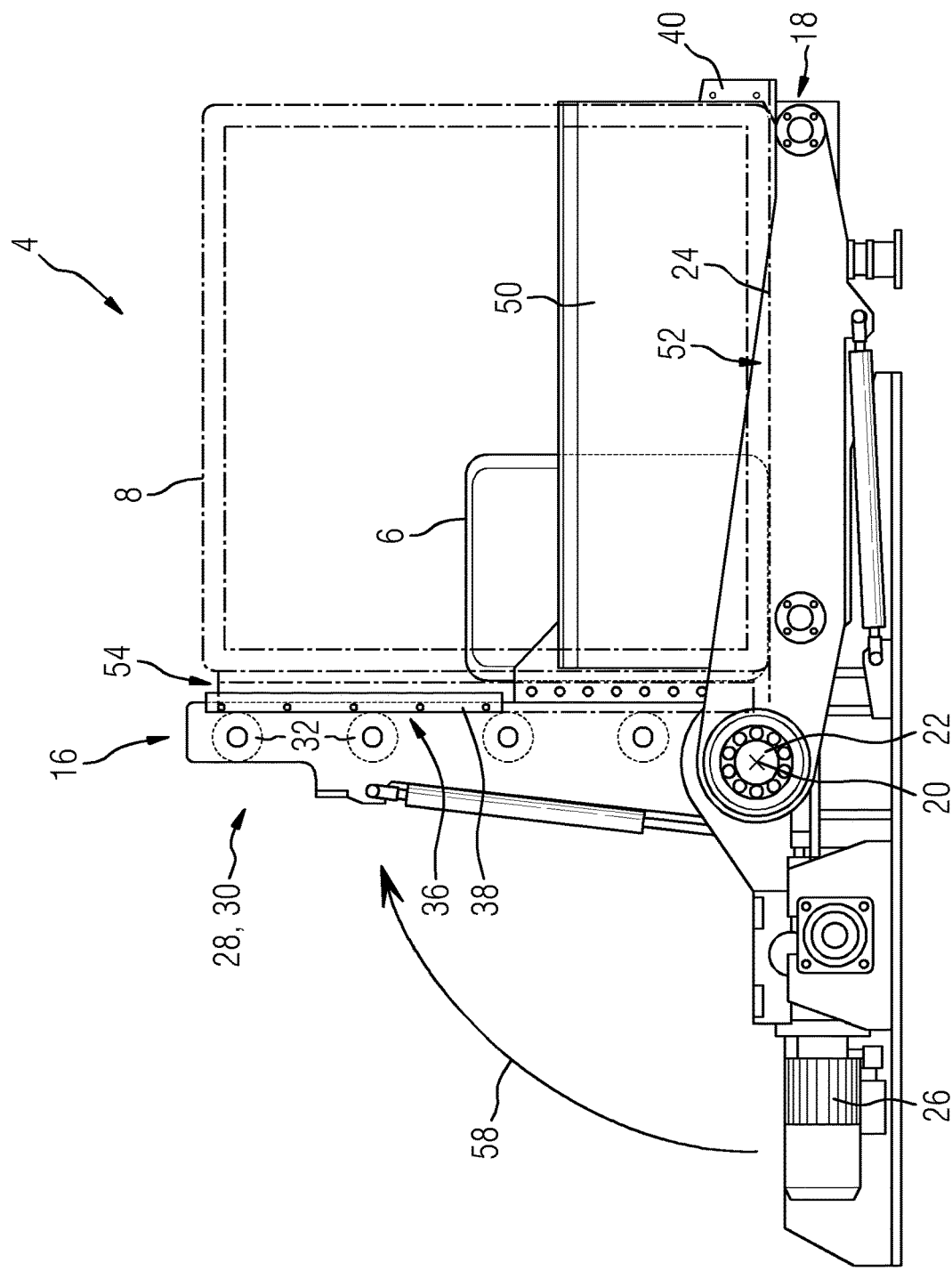
FIG. 7 shows the unloading device from FIG. 3 and the large container, wherein the tilting unit is positioned in the tilted position and the platform is positioned in the flipped down position.

The tilting unit 16 is configured, during transition of the platform 18 from the flipped up position into the flipped down position—in particular starting from the initial position of the tilting unit 16—to tilt together with the platform 18 about the common rotational axis 20 in such a way that the position of the platform 18 does not change relative to the tilting unit 16 (cf. FIG. 5 to FIG. 7).

This means that the tilting unit 16 is configured, during transition of the platform 18 from the flipped up position into the flipped down position—in particular starting from the initial position of the tilting unit 16—to tilt together with the platform 18 about the common rotational axis 20 in such a way that the tilting unit 16 carries out a movement about the common rotational axis 20 with the same angular speed and in the same direction as the platform 18 does at the same time.

The tilting unit 16 is further configured, after tilting, to return to the initial position, wherein the platform 18 remains in the flipped down position.

During the tilting process the tilting unit 16 moves from its initial position into a tilted position of the tilting unit 16. The tilting process can further comprise a transition of the tilting unit 16 from its tilted position back into its initial position.

The unloading device 4 has a conveyor means 28 which is configured to convey the large container onto the tilting unit and to position it.

In this example the conveyor means 28 for positioning the large container is embodied as a roller conveyor 30. The roller conveyor 30 comprises a number of conveyor rollers 32. In this example slats 34 are arranged between the conveyor rollers 32. The slats 34 are elements of the unloading device 4, in particular elements of the tilting unit 16. The conveyor rollers 32 project with their upper edge from between the slats 34, so that a force transmission to a large container 8 arranged thereon (cf. FIG. 3) is made possible.

The slats 34 make it possible easily to step onto the roller conveyor 30, to open the side of a large conveyor 8 for example. The slats 34 further prevent objects falling between the conveyor rollers 32 and thereby causing the conveyor rollers 32 to jam.

In principle however other conveyor means 28 are also possible.

In this exemplary embodiment the conveyor means 28 for positioning the large container 8 is a part of the tilting unit 16. This means that the tilting unit 16 is tilted with the conveyor means 28 for positioning the large container 8 during the tilting process.

In principle the conveyor means 28 for positioning the large container 8 can also be separate from the tilting unit, so that the conveyor means 28 is not tilted as well during the tilting process. For example the slats 34 can be tilted as well during the tilting process, while the conveyor rollers 32 remain in their position during the tilting process, i.e. are not tilted as well.

The unloading device 4 comprises a latching apparatus 36 for latching a large container 8 positioned on the tilting unit 16. When a large container 8 is positioned (cf. FIG. 4), the large container 8 is latched onto the tilting unit 16 using the latching apparatus 36.

In this exemplary embodiment the latching apparatus 36 has a number of engaging elements 38 for engaging onto a lower edge of the large container 8.

The latching of the large container 8 enables a fixed positioning of the large container 8 in relation to the tilting unit 16 to be achieved during the tilting process.

The tilting unit 16 has a frame-shaped stop 40. The frame-shaped stop has a cutout 41. The frame-shaped stop 40 is arranged vertically. In particular the frame-shaped stop 40 is at right angles to a support surface 24 of the tilting unit 16, on which support surface 24 the large container 8 can lie (see also FIG. 3). In this case the support surface 24 of the tilting unit 16 is a support surface 24 of the conveyor means 28 for positioning.

The frame-shaped stop 40 has a first side 42 and a second side 44 opposite the first side 42.

When a laterally open large container 8 is positioned on the tilting unit 16, then the opening side 52 of the large container 8 rests against the first side 42 of the frame-shaped stop 40 (cf. FIG. 4, FIG. 5).

By means of the frame-shaped stop 40 an improved force transmission from the tilting unit 16 to a large container 8 can be achieved. Moreover by means of the frame-shaped stop 40 a fixed positioning of a large container 8 in relation to the tilting unit 16 can be achieved during the tilting process.

In the flipped up state the platform 18 rests against the second side 44 of the frame-shaped stop 40 (cf. FIG. 5).

The platform 18 has a conveyor means 46 for transporting away bulk goods 6. The conveyor means 46 for transporting away bulk goods 6 is embodied in this example as a belt conveyor 48. By means of the conveyor means 46 for transporting away bulk goods 6 bulk goods 6 lying on the platform 18 can be fed to the separation unit 10.

The platform 18 further has lateral delimiting elements 50. By means of the delimiting elements 50 a guidance of bulk goods 6 can be achieved. In particular bulk goods 6 can be prevented from falling down off the sides of the platform 18 by the delimiting elements 50.

Moreover a conveyor means 56 for feeding large containers 8 is shown in FIG. 1 and FIG. 2. By means of the conveyor means 56 for feeding large containers 8, large containers 8 can be fed to the unloading system 2.

In this example the conveyor means 56 for feeding large containers 8 is embodied as a roller conveyor 30. In principle the conveyor means 56 can also be a belt conveyor, a conveyor truck, a conveyor crane etc. however.

Figure 3:
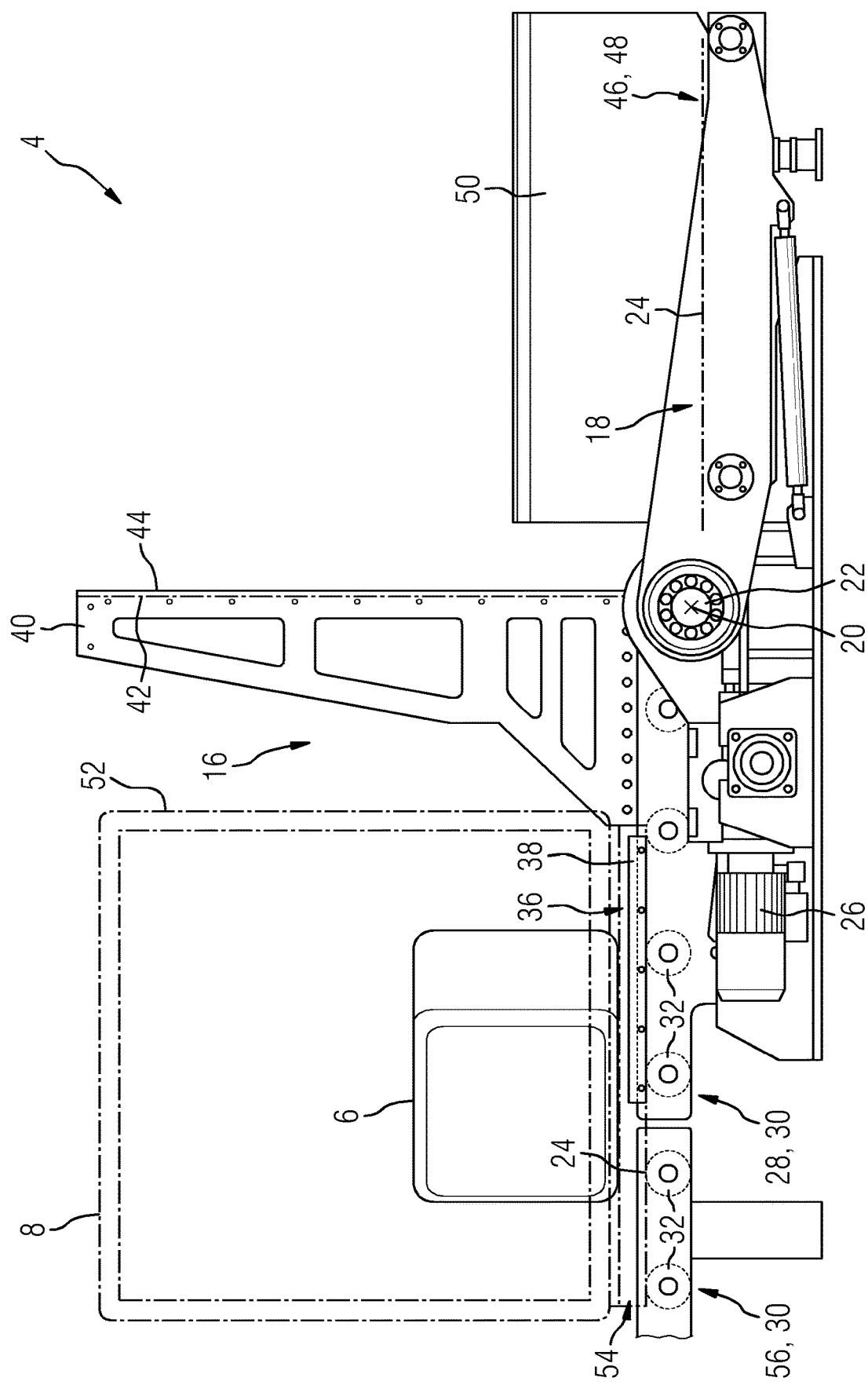
FIG. 3 shows the unloading device from FIG. 1 and a large container, which is filled with bulk goods, before positioning.

FIG. 3 shows the unloading device 4 from FIG. 1. FIG. 3 further shows a large container 8 before its positioning. The large container 8 is filled with at least one bulk good 6. In this example the large container 8 is filled with a number of bulk goods 6. In FIG. 3 (and also in the following figures) a bulk good 6 embodied as an item of baggage is shown by way of example, the other bulk goods 6 are not shown.

The large container 8 in this example is a transport container, in particular a Unit Load Device.

The large container 8 is fed to the unloading device 4 by means of the conveyor means 56 for feeding large containers 8.

The side of the large container 8 is opened. This step can for example also be carried out manually. It is further possible for the large container 8 to be fed to the unloading device 4 already laterally open.

The opening side 52 of the large container 8, i.e. the side on which the large container 8 is laterally open, points toward the frame-shaped stop 40 of the tilting unit 16. This means that here the opening side 52 points to the right in accordance with the drawing.

Using the conveyor means 28 for positioning the large container 8, the large container 8 is positioned on the tilting unit 16. The conveyor rollers 32 of the conveyor means 28 embodied as a roller conveyor 30 are shown as dashed lines in FIG. 3.

The large container 8 is positioned on the tilting unit 16 in such a way that the opening side 52 of the large container 8 rests against the frame-shaped stop 40 of the tilting unit 16 (see FIG. 4).

The first side 42 of the frame-shaped stop 40 is shown as a dashed and dotted line.

FIG. 4 shows the unloading device 4 and the large container 8 from FIG. 3, wherein the large container 8 is laterally open and positioned in FIG. 4.

The large container 8 is positioned on the tilting unit 16 in such a way that the opening side 52 of the large container 8 rests against the frame-shaped stop 40 of the tilting unit 16.

The positioned large container 8 rests with its opening side 52 against the first side 42 of the frame-shaped stop 40.

The cutout 41 of the frame-shaped stop 40 is at least essentially as large as the opening of the opening side 52 of the large container 8.

Because of the cutout 41 of the frame-shaped stop 40 the opening side 52 of the large container 8 is not closed by the frame-shaped stop 40.

The positioned large container 8 is latched on the tilting unit 16, in particular for the tilting process, using the latching apparatus 36. For latching the large container 8 the number of engagement elements 38 of the latching apparatus 36 engage in a lower edge 54 of the large container 8.

The latching of the large container 8 enables a fixed positioning of the large container 8 with regard to the tilting unit 16 during the tilting process to be achieved.

In FIG. 4 the platform 18 flips up. This means that the platform 18 moves from the flipped down position (cf. FIG. 3) into the flipped up position (cf. FIG. 5). When it is being flipped up the platform 18 moves by an angle 58 of 90° about the rotational axis 20.

The support surface 24 of the platform 18 is hidden by the lateral delimiting element 50, but is shown as a dashed and dotted line.

When the platform 18 is flipped up the tilting unit 16 remains in its initial position.

In principle the platform 18 could also already be flipped up when the large container 8 is positioned on the tilting unit 16 (not shown).

FIG. 5 shows the unloading device 4 from FIG. 4 and the large container 8, wherein the platform 18 is positioned in its flipped up position.

The platform 18, in the flipped up state, rests against the second side 44 of the frame-shaped stop 40.

The platform 18, in its flipped up position, closes the opening side 52 of the large container 8.

FIG. 6 shows the unloading device 4 and the large container 8 from FIG. 5, wherein the tilting unit 16 is tilted together with the large container 8 and the platform 18.

In this process the tilting unit 16, together with the large container 8 located thereon and the platform 18 closing the opening side 52 of the large container 8, is tilted about the common rotational axis 20 in such a way that the large container 8 is positioned on its opening side 52 (cf. FIG. 7). In this process the bulk goods 6 are deposited on the platform 18.

During tilting the platform 18 goes from its flipped up position (cf. FIG. 5) into its flipped down position (cf. FIG. 7 and FIG. 8), i.e. the platform 18 is flipped down.

On transition of the platform 18 from the flipped up position into the flipped down position, the tilting unit 16 tilts together with the platform 18 about the common rotational axis 20 in such a way that the position of the platform 18 relative to the tilting unit 16 does not change. This means that the platform 18 closes the opening side 52 of the large container 8 during the tilting.

During the tilting the tilting unit 16 goes from its initial position (CF. FIG. 4, FIG. 5) into its tilted position (cf. FIG. 7).

The tilting unit 16 and the platform 18 are tilted about the common rotational axis 20 by an angle 58 of 90° (see FIG. 7). Since the large container 8 is lying on the tilting unit 16, the large container 8 is also tilted about the same common rotational axis 20 by an angle 58 of 90°.

The frame-shaped stop 40 and/or the latching prevent the large container 8 from slipping and/or tilting away during this process.

During tilting the bulk goods 6 in the large container 8 slide in the direction of the opening side 52 of the large container 8 and thus in the direction of the platform 18. In this way the bulk goods 6 are deposited on the platform 18. Since the bulk goods 6 do not fall down the bulk goods 6 are protected.

FIG. 7 shows the unloading device 4 and the large container 8 from FIG. 6, wherein the tilting unit 16 is positioned in the tilted position and the platform 18 is positioned in the flipped down position.

In FIG. 7 too the platform 18 closes the opening side 52 of the large container 8.

The large container 8 is positioned on its opening side 52. The bulk goods 6 lie on the platform 18. It is possible that individual bulk goods 6 are still leaning against the wall of the large container 8 (not shown), but the bulk goods 6 are lying on the platform 18 instead of on the large container 8.

After the tilting, i.e. starting from the tilted position of the tilting unit 16 (FIG. 7), the tilting unit 16 is tilted back into the initial position (cf. FIG. 8). In this process the tilting unit 16 is tilted back together with the large container 8.

During tilting back the platform 18 remains in the flipped down position. This means that the bulk goods 6 remain on the platform 18. This also means that the tilting unit 16 is tilted back together with the emptied large container 8.

In this way the bulk good 6 or the bulk goods 6 can be unloaded from the large container 8.

FIG. 8 shows the unloading device 4 and the emptied large container 8 from FIG. 7, wherein the tilting unit 16 is tilted back together with the large container 8 and the platform 18 has remained in the flipped down position.

The bulk goods 6 lying or remaining on the platform 18 are then transported away by means of the conveyor means 46 for transporting the bulk goods 6 away from the platform 18. In particular the bulk goods 6 are fed from the platform 18 to the separation unit 10 of the unloading system 4 shown in FIG. 1 and FIG. 2.

By means of the separation unit 10 a one-dimensional flow of bulk goods is created.

Although the invention has been illustrated and described in greater detail by the preferred exemplary embodiments, the invention is not restricted by the disclosed examples and other variations can be derived herefrom by the person skilled in the art without departing from the scope of protection of the invention

LIST OF REFERENCE CHARACTERS

2 Unloading system
4 Unloading device
6 Bulk goods
8 Large container
10 Separation unit
12 Lifting gate
14 Leveler
16 Tilting unit
18 Platform
20 Rotational axis
22 Shaft 24 Support surface
25 Support surface
26 Drive element, motor
28 Conveyor means for positioning
30 Roller conveyor
32 Conveyor roller
34 Slat
36 Latching apparatus
38 Engagement element
40 Frame-shaped stop
41 Cutout
42 First side
44 Second side
46 Conveyor means for transporting away
48 Belt conveyor
50 Delimiting element
52 Opening side
54 Lower edge
56 Conveyor means for feeding
58 Angle

The invention claimed is:

1. A method for unloading bulk goods from a laterally open container using an unloading device with at least one tilting unit and a platform, wherein the at least one tilting unit and the platform have a common rotational axis, which comprises the steps of:
   positioning the laterally open container, which is filled with at least one bulk good, on the at least one tilting unit;
   flipping up the platform in such a way that the platform closes an opening side of the laterally open container;
   tilting the at least one tilting unit, together with the laterally open container located thereon, and the platform closing the opening side of the laterally open container, about the common rotational axis in such a way that the laterally open container is positioned on the opening side, wherein the at least one bulk good is deposited on the platform; and
   tilting back the at least one tilting unit, together with the laterally open container, wherein the at least one bulk good remains on the platform.

2. The method according to claim 1, wherein the laterally open container is positioned on the at least one tilting unit using a conveyor.

3. The method according to claim 1, which further comprises positioning the laterally open container on the at least one tilting unit in such a way that the opening side of the laterally open container rests against a frame-shaped stop of the at least one tilting unit.

4. The method according to claim 1, which further comprises latching the laterally open container now positioned on the at least one tilting unit using a latching apparatus.

5. The method according to claim 1, which further comprises tilting the at least one tilting unit, the laterally open container and the platform at least 65° and by a maximum of 115° about the common rotational axis.

6. The method according to claim 1, which further comprises transporting the at least one bulk good remaining on the platform away from the platform by means of a conveyor.

7. The method according to claim 1, wherein at least if a plurality of bulk goods has been unloaded, the bulk goods are fed from the platform to a separation unit, by which a one-dimensional flow of the bulk goods is created.

8. The method according to claim 1, which further comprises tilting the at least one tilting unit, the laterally open container and the platform at least 75° and by a maximum of 105° about the common rotational axis.

9. The method according to claim 1, which further comprises tilting the at least one tilting unit, the laterally open container and the platform at least 80° and by a maximum of 100° about the common rotational axis.

10. An unloading device for unloading bulk goods from a laterally open container, the unloading device comprising:
    a tilting unit and a platform having a common rotational axis, about which said tilting unit and said platform are able to be moved;
    said platform being able to be positioned in a flipped down position and in a flipped up position;
    said platform, in the flipped up position, when the laterally open container is positioned on said tilting unit, closes an opening side of the laterally open container;
    said tilting unit is configured, during a transition of said platform from the flipped up position into the flipped down position, to tilt together with said platform about the common rotational axis in such a way that a position of said platform relative to said tilting unit does not change, wherein in the flipped down position the container is positioned on the opening side adjacent said tilting unit allowing the bulk goods to be deposited on said platform; and
    said tilting unit is configured to tilt back into an initial position after tilting, wherein said platform remains in the flipped down position with any deposited said bulk goods.

11. The unloading device according to claim 10, further comprising a conveyor configured to position the laterally open container on said tilting unit.

12. The unloading device according to claim 10, wherein:
    said tilting unit has a frame-shaped stop;
    when the laterally open container is positioned on said tilting unit, the laterally open container rests with the opening side against a first side of said frame-shaped stop; and
    said platform, in the flipped up state, rests against a second side of said frame-shaped stop.

13. The unloading device according to claim 10, further comprising a latching apparatus for latching the laterally open container positioned on said tilting unit.

14. The unloading device according to claim 10, wherein said platform has a conveyor for transporting away the bulk goods.

15. An unloading system, comprising:
    the unloading device according to claim 10; and
    a separation unit disposed downstream of said unloading device for creating a one-dimensional flow of the bulk goods.

16. The unloading system according to claim 15, wherein said separation unit has a lifting gate and a leveler.

17. An unloading method, which comprises the steps of:
    providing the unloading device according to claim 10 for unloading items of baggage and/or packages from the laterally open container.

18. The method according to claim 17, wherein the laterally open container is a transport container.

* * * * *